(12) United States Patent
Chen

(10) Patent No.: US 8,451,239 B2
(45) Date of Patent: May 28, 2013

(54) DRIVING CIRCUIT AND METHOD FOR DRIVING TOUCH DISPLAY

(75) Inventor: Yen-Hua Chen, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 371 days.

(21) Appl. No.: 12/761,360

(22) Filed: Apr. 15, 2010

(65) Prior Publication Data

US 2010/0265199 A1     Oct. 21, 2010

(30) Foreign Application Priority Data

Apr. 16, 2009 (CN) .......................... 2009 1 0301599

(51) Int. Cl.
*G06F 3/041*     (2006.01)
(52) U.S. Cl.
USPC ........................................ 345/173
(58) Field of Classification Search
USPC ................................ 345/173, 174
See application file for complete search history.

(56) References Cited

U.S. PATENT DOCUMENTS

| | | | |
|---|---|---|---|
| 5,977,957 A | 11/1999 | Miller et al. | |
| 6,259,437 B1 * | 7/2001 | Onodaka et al. | 345/174 |
| 2006/0256093 A1 * | 11/2006 | Furukawa et al. | 345/173 |
| 2008/0296073 A1 * | 12/2008 | McDermid | 178/18.05 |
| 2009/0146966 A1 * | 6/2009 | Liu | 345/173 |
| 2010/0013790 A1 * | 1/2010 | Ahn et al. | 345/174 |

FOREIGN PATENT DOCUMENTS

CN         1257590 A       6/2000

* cited by examiner

*Primary Examiner* — Chanh Nguyen
*Assistant Examiner* — Roy Rabindranath
(74) *Attorney, Agent, or Firm* — WPAT, PC; Justin King

(57) ABSTRACT

A driving circuit and method for a touch panel having a plurality of scan lines includes a detection module, an interruption module and a selective scan module. The detection module can periodically scan the scan lines, so as to detect whether the touch panel is controlled by touch. The interruption module can turn off the detection module when the touch panel is not controlled by touch. The selective scan module can select at least one set of scan lines from the plurality of scan lines to periodically and synchronously scan the set of selected scan lines when the detection module is turned off, where scanning of the selected scan lines detects whether the touch panel is touched.

17 Claims, 4 Drawing Sheets

DRIVING CIRCUIT AND METHOD FOR DRIVING TOUCH DISPLAY

BACKGROUND

1. Technical Field

The present disclosure relates to a driving circuit, and more particularly to a driving circuit and method for driving a touch display.

2. Description of Related Art

Touch panels are popular in industry and in other situations, such as museum displays or room automation, where keyboard and mouse systems do not allow a satisfactory, intuitive, rapid, or accurate interaction by the user with the display's content.

Touch panels include various types, such as a resistive touch panel and a capacitive touch panel. When an object, such as a finger, presses down on a point on the resistive touch panel, the resistive touch panel measures this point. As the human body is also a conductor, touching the surface of the capacitive touch panel results in a distortion of the local electrostatic field, measurable as a change in capacitance.

In the capacitive touch panel, an electric circuit is connected to scan lines arranged in rows and columns of the capacitive touch panel for detecting the change in capacitance, so as to determine the location of the touch. Thus, power consumption arises in the course of operating the capacitive touch panel.

SUMMARY

The present disclosure discloses a driving circuit for a touch panel, the touch panel having a plurality of scan lines, the driving circuit comprising:

According to one embodiment of the present disclosure, a driving circuit for a touch panel is disclosed, wherein the touch panel has a plurality of scan lines. The driving circuit includes a detection module, an interruption module and a selective scan module. The detection module can periodically scan the scan lines, so as to detect whether the touch panel is controlled by touch. The interruption module can turn off the detection module when the touch panel is not controlled by touch. The selective scan module can select at least one set of scan lines from the plurality of scan lines to periodically and synchronously scan the set of selected scan lines when the detection module is turned off, wherein scanning of the selected scan lines detects whether the touch panel is touched.

Moreover, a touch display includes the foresaid driving circuit, a touch panel, a backlight source and a power switch module. The touch panel has a plurality of scan lines. The power switch module can turn off the backlight source when the touch panel is not controlled by touch.

According to another embodiment of the present disclosure, a method for driving a touch display, the touch display has a plurality of scan lines. The method includes steps as follows: (a) The scan lines periodically are scanned so as to detect whether the touch display is controlled by touch; (b) The step (a) is stopped when the touch display is not controlled by touch; (c) at least one set of scan lines are selected from the plurality of scan lines to periodically and synchronously scan the set of selected scan lines when the step (a) is stopped, wherein scanning of the set of selected scan lines detects whether the touch display is touched.

Thus, a certain of the scan lines are synchronously scanned when the touch panel is not controlled by touch, so as to reduce the number of the scan. When the number of the scan is less, the number of charging and discharging is less, so that electricity is saved.

DETAILED DESCRIPTION

Figure 1:
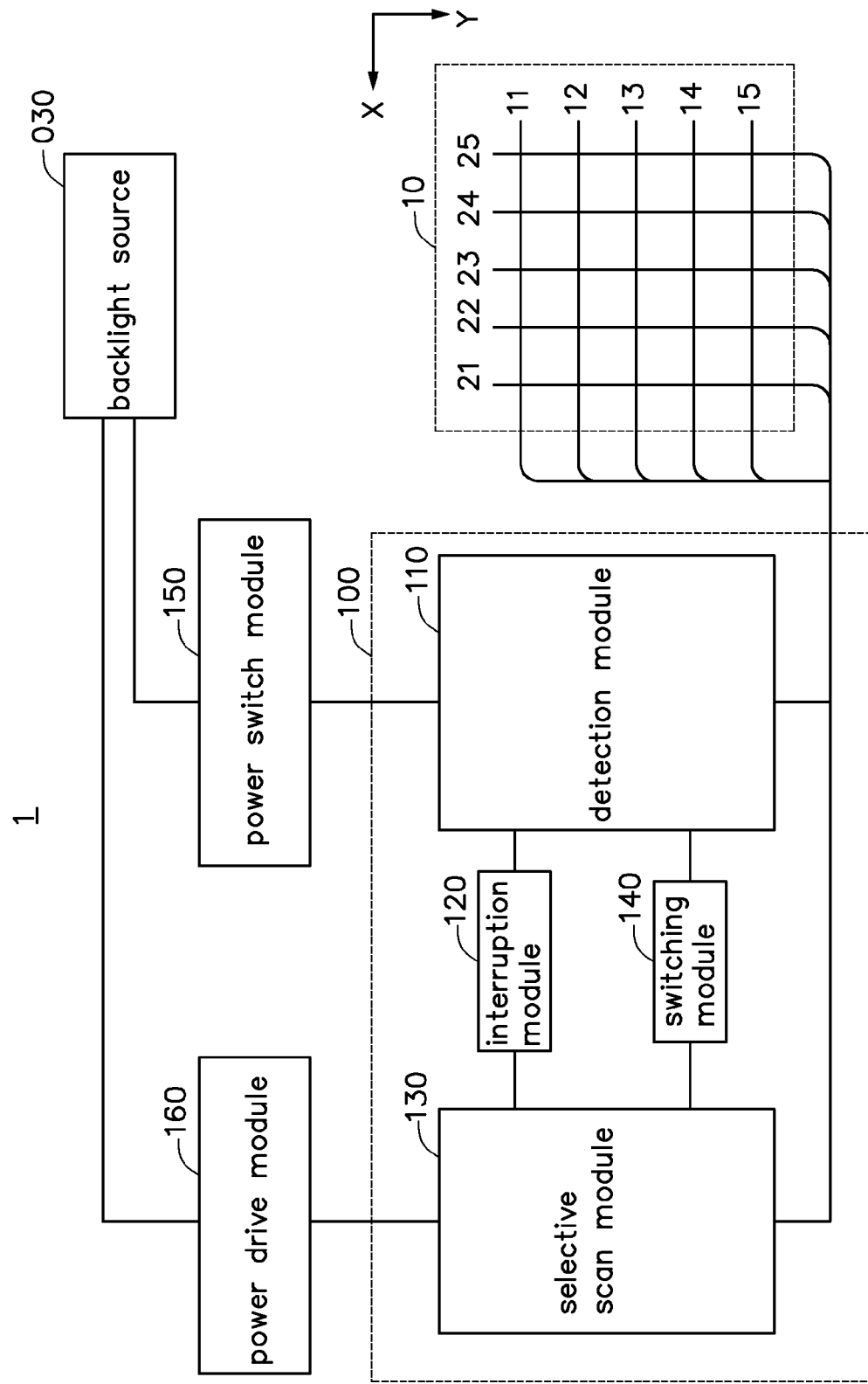
FIG. 1 is a block diagram of a driving circuit for a touch panel according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

In one or more aspects, the present disclosure is directed to a driving circuit for a touch panel. The driving circuit may be applied to existing devices and may be applicable or readily adaptable to all technology. FIG. 1 is presented to illustrate the block diagram of the apparatus.

As shown in FIG. 1, the driving circuit 100 for a touch panel 10, where the touch panel 10 comprises a plurality of the scan lines 11, 12, 13, 14, 15, 21, 22, 23, 24, and 25. These scan lines 11, 12, 13, 14, 15, 21, 22, 23, 24, 25 may be divided into first scan lines 11, 12, 13, 14, 15 and second scan lines 21, 22, 23, 24, 25. The first scan lines 11, 12, 13, 14, and 15 are arranged parallel and along a first direction X. The second scan lines 21, 22, 23, 24 and 25 are arranged parallel and along a second direction Y. The first direction X and the second direction Y can be perpendicular. The first scan lines 11, 12, 13, 14, 15 and the second scan lines 21, 22, 23, 24, 25 are intersected vertically, and the first scan lines 11, 12, 13, 14, 15 are electrically insulated from the second scan lines 21, 22, 23, 24, 25. It should be appreciated that foresaid five first scan lines and five second scan lines illustrated in FIG. 1 are only examples and should not be regarded as limitations of the present disclosure. Those with ordinary skill in the art may choose the amount of scan lines depending on the desired application.

The driving circuit 100 comprises a detection module 110, an interruption module 120, and a selective scan module 130. The detection module 110 can periodically scan the scan lines 11, 12, 13, 14, 15, 21, 22, 23, 24, and 25, so as to detect whether the touch panel 10 is controlled by an object touching the touch panel 10 for a brief moment (hereinafter, "controlled by touch"). The object could be a finger, a stylus, or the others. The interruption module 120 can turn off the detection module 110 when the touch panel 10 is not controlled by touch. Thus, the detection module 110 stops scanning the scan lines 11, 12, 13, 14, 15, 21, 22, 23, 24, and 25.

After the detection module 110 is turned off, the selective scan module 130 can select at least one set of scan lines from the scan lines 11, 12, 13, 14, 15, 21, 22, 23, 24, and 25 to periodically and synchronously scan the set of scan lines when the detection module 110 is turned off, wherein scanning of the selected scan lines detects whether the touch panel 10 is touched.

In one or more embodiments, the selective scan module 130 can selects the scan lines 11, 12, 13, 14, 15, 21, 22, 23, 24 and, 25 to periodically and synchronously scan the scan lines 11, 12, 13, 14, 15, 21, 22, 23, 24, and 25. Alternatively, the selective scan module 130 can select the first scan lines 11, 12, 13, 14, and 15 to periodically and synchronously scan the first scan lines 11, 12, 13, 14, and 15. Alternatively, the selective scan module 130 can select the second scan lines 21, 22, 23, 24, and 25 to periodically and synchronously scan the second scan lines 21, 22, 23, 24, and 25. Alternatively, the selective scan module 130 can selects at least one set of first scan lines from the first scan lines 11, 12, 13, 14, and 15 to periodically and synchronously scan the set of first scan lines, such as odd numbered scan lines 11, 13, and 15 or even numbered scan lines 12 and 14. Alternatively, the selective scan module 130 can selects at least one set of second scan lines form the second scan lines 21, 22, 23, 24, and 25 to periodically and synchronously scan the set of the second scan lines, such as odd numbered scan lines 21, 23, and 25 or even numbered scan lines 22 and 24. Those with ordinary skill in the art may opt a certain of the scan lines depending on the desired application as long as scanning of the selected scan lines can detect whether the touch panel 10 is touched.

When a user touches and manipulates the touch panel 10, the detection module 110 can periodically scan the scan lines 11, 12, 13, 14, 15, 21, 22, 23, 24, and 25 one by one, so as to detect whether the touch panel 10 is controlled by touch. Thus, a desired resolution in operation and a fast response speed are achieved. The action of the user for using the touch panel 10 is divided into three portions: point contact, awaiting touch, and idling. In the idling period, the touch panel 10 is not controlled by touch. In the period of point contact and the period of awaiting touch, the touch panel 10 is controlled by touch. The detection module 110 can periodically scan the scan lines 11, 12, 13, 14, 15, 21, 22, 23, 24, and 25 one by one during the period of point contact and the period of awaiting touch. In one or more embodiments, the detection module 110 can set a waiting time. After the touch panel 10 is contacted and then during the waiting time the touch panel 10 is not contacted again, that is, the touch panel 10 is not controlled by touch. Therefore, the touch panel 10 is idle; accordingly, the interruption module 120 can turn off the detection module 110, so that the selective scan module 130 can periodically and synchronously scan at least one set of scan lines selected from the scan lines 11, 12, 13, 14, 15, 21, 22, 23, 24, and 25.

When the detection module 110 detects that the touch panel 10 is not controlled by touch, this detection result indicates that it is not necessary to detect the exact contact point. In this situation, it is only necessary to detect whether the touch panel 10 is touched again. Accordingly, the interruption module 120 turns off the detection module 110, and the selective scan module 130 periodically and synchronously scans at least one set of scan lines selected from the scan lines 11, 12, 13, 14, 15, 21, 22, 23, 24, and 25. For example, the selective scan module 130 periodically and synchronously scans the first scan lines 11, 12, 13, 14, and 15. In other words, the selective scan module 130 outputs the same scanning signal to all first scan lines 11, 12, 13, 14, and 15, so as to reduce the number of the scanning times. When the number of the scanning times is less, the number of charging and discharging is less, so power is saved.

Moreover, the detection module 110 can scan the scan lines 11, 12, 13, 14, 15, 21, 22, 23, 24, and 25 one by one during the first scan period; the selective scan module 130 can synchronously scan the scan lines 11, 12, 13, 14, 15, 21, 22, 23, 24, and 25 once during the second scan period. The first scan period may be equal to the second scan period. Alternatively, the first scan period may be greater or less than the second scan period. Those with ordinary skill in the art may adjust the ratio of first scan period and the second scan period depending on the desired application.

In FIG. 1, the driving circuit 100 comprises a switching module 140. In use, the switching module 140 can turn on the detection module 110 and turn off the selective scan module 130 when the touch panel 10 is touched. When the selective scan module 130 detects that the touch panel 10 is controlled by touch, this detection result indicates that it is necessary to detect the exact contact point. In this situation, the switching module 140 turns off the selective scan module 130 and turns on the detection module 110, so that the detection module 110 periodically scans the first scan lines 11, 12, 13, 14, 15 and the second scan lines 21, 22, 23, 24, 25 one by one. Thus, a desired resolution in operation and a fast response speed are achieved.

In use, the driving circuit 100 can transform the external input signals into the internal readable command signals. In practice, the foresaid modules may be hardware and/or software. The use of hardware or software is generally a design choice representing cost vs. efficiency tradeoffs.

In FIG. 1, the above-mentioned driving circuit 100 can be used in a touch display 1. The touch display 1 includes the driving circuit 100, the touch panel 10, a backlight source 030, a power switch module 150 and a power drive module 160. The power switch module 150 can turn off the backlight source 030 when the touch panel 10 is not controlled by touch, so that backlight source 030 does not emit light. The power drive module 160 can turn on the backlight source 030 when the touch panel 10 is touched, so that backlight source 030 emits light.

When the detection module 110 detects that the touch panel 10 is not controlled by touch, the power switch module 150 turns off the backlight source 030, so as to save electricity. Moreover, when the detection module 110 detects that the touch panel 10 is controlled by touch again, the power drive module 160 turns on the backlight source 030, so as to provide light for the user.

In this embodiment, the power switch module 150 and the power drive module 160 can be integrated into the touch display 1. In practice, the power switch module 150 and the power drive module 160 may be hardware and/or software.

Figure 4:
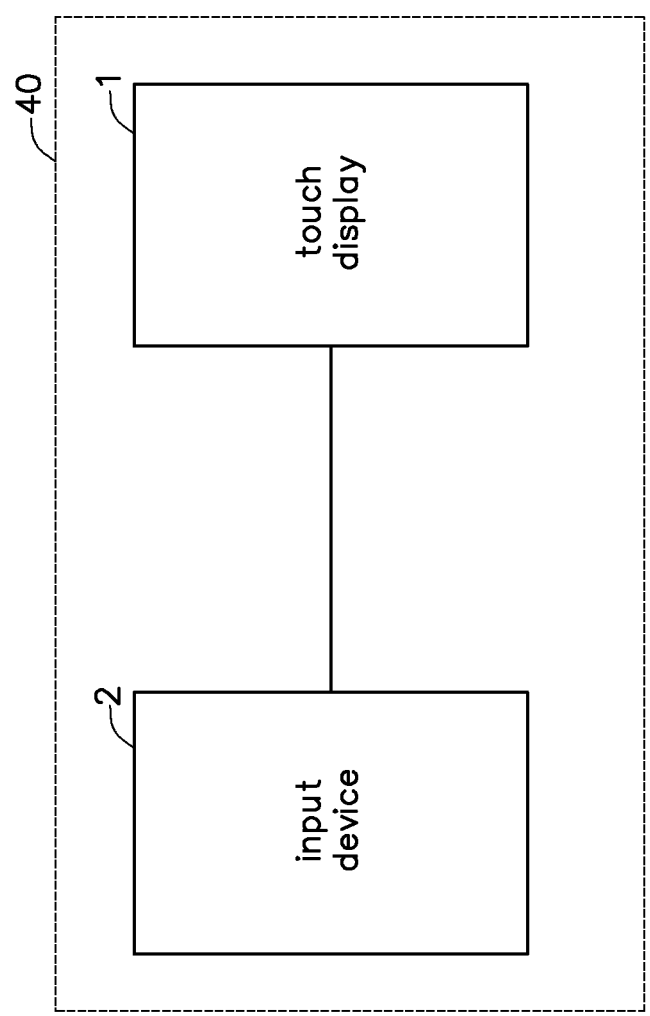
FIG. 4 is a schematic diagram illustrating an electronic device incorporating the touch display of FIG. 1 according to embodiments of the present disclosure.

FIG. 4 is a schematic diagram illustrating an electronic device incorporating the touch display 1 of FIG. 1 according to embodiments of the present disclosure. An input device 2 is coupled to the touch display 1 to form an electronic device 40. The input device 2 can include a processor or the like to input data to the touch display 1 to render an image. The electronic device 40 can be, for example, a computer, a notebook computer, a mobile telephone, a portable electronic game, a television, or a digital camera.

Figure 2:
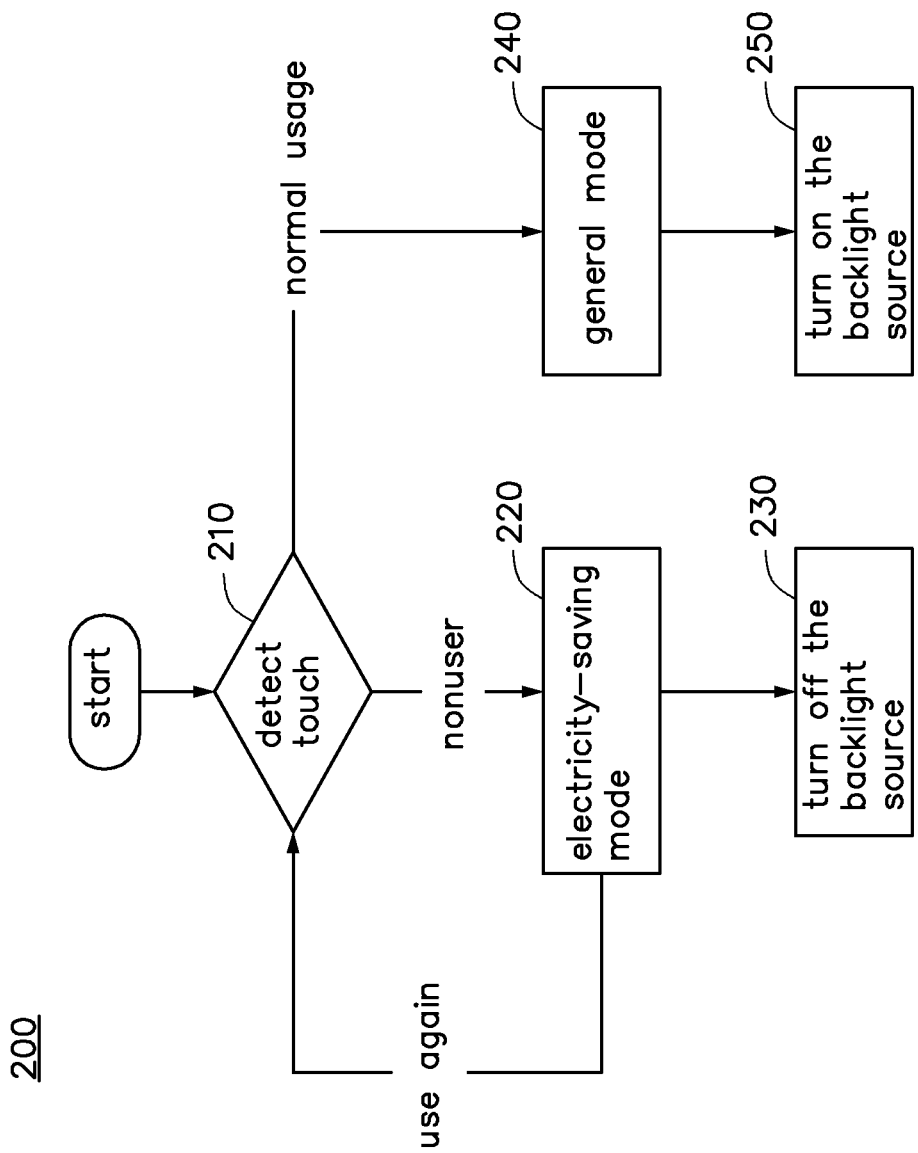
FIG. 2 is a flowchart of a method for driving a touch display according to another embodiment of the present disclosure.

In one or more aspects, the present disclosure is directed to a method for driving a touch display 1. The method may be easily inserted into existing devices and may be applicable or readily adaptable to all technology. FIG. 2 is presented to illustrate the flowchart of the method.

FIG. 2 is a flowchart of the method 200 for driving a touch display. The touch display can be the touch display 1 of FIG. 1 as mentioned above, including the driving circuit 100, the touch panel 10, the backlight source 030, the power switch module 150, and the power drive module 160. The touch panel comprises a plurality of the scan lines. These scan lines may be divided into first scan lines and second scan lines. The first and scan lines and the second scan lines are intersected vertically, and the first scan lines are electrically insulated from the second scan lines. The method 200 comprises steps 210-250 as follows. The steps are not recited in the sequence in which the steps are performed. That is, unless the sequence of the steps is expressly indicated, the sequence of the steps is interchangeable, and all or part of the steps may be simultaneously, partially simultaneously, or sequentially performed. The implements to perform the driving method 200 disclosed in above embodiments, thus, are not repeated herein.

In step 210, the scan lines are periodically scanned so as to detect whether the touch panel is controlled by touch. Specifically, the scan lines are periodically scanned one by one in step 210. Thus, a desired resolution in operation and a fast response speed are achieved. In addition, whether the touch panel is controlled by touch can be detected.

When the touch panel is not controlled by touch as detected in step 210, this detection result indicates that it is not necessary to detect the exact contact point. In this situation, it is only necessary to detect whether the touch panel is touched again. Therefore, step 220 (electricity-saving mode) is to stop periodically scanning the scan lines, and at least one set of scan lines selected from the scan lines are periodically and synchronously scanned in step 220. The set of selected scan lines is scanned to sense whether the touch panel is touched. In other words, the same scanning signal is outputted to the selected set of scan lines so as to reduce the number of the scanning times. When the number of the scanning times is less, the number of charging—and—discharging is less, so that electricity is saved.

In one or more embodiments, all of the scan lines are selected to and are periodically and synchronously scanned in step 220. Alternatively, the first scan lines are selected to periodically and synchronously scan the first scan lines in step 220. Alternatively, the second scan lines are selected to periodically and synchronously scan the second scan lines in step 220. Alternatively, at least one set of first scan lines are periodically and synchronously scanned in step 220, wherein the selected first scan lines are odd numbered scan lines or even numbered scan lines of the first scan lines. Alternatively, at least one set of second scan lines are periodically and synchronously scanned in step 220, wherein the selected second scan lines are odd numbered scan lines or even numbered scan lines of the second scan lines. Those with ordinary skill in the art may opt a certain of the scan lines in step 220 depending on the desired application as long as the certain of the scan lines are scanned enough to sense whether the touch panel is touched.

When the touch panel is touched again as detected in step 220, this detection result indicates that the user may operate the touch panel. Therefore, step 220 is stopped, and step 210 is performed so as to detect whether the touch panel is controlled by touch.

In step 230, the backlight source is turned off when the touch panel is not controlled by touch, so that the backlight source does not emit light for saving electricity.

When the touch panel is controlled by touch as detected in step 210, this detection result indicates that it is necessary to detect the exact contact point. Therefore, in step 240 (general mode), the scan lines are periodically scanned one by one so as to detect whether the touch panel is controlled by touch. Specifically, all of the scan lines are periodically scanned one by one in step 240. Thus, a desired resolution in operation and a fast response speed are achieved.

In step 250, the backlight source is turned on when the touch panel is touched, so that the backlight source emits light for the user.

Figure 3:
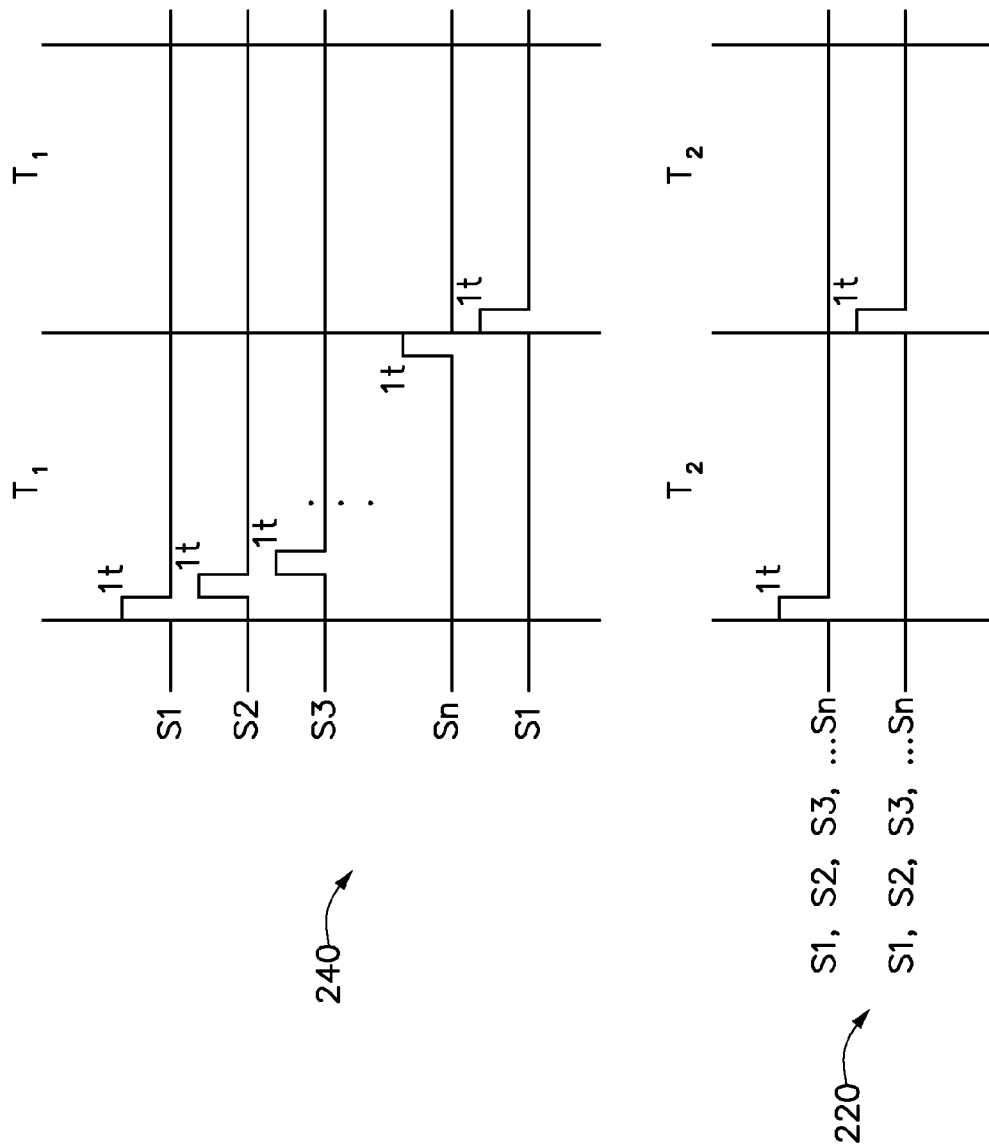
FIG. 3 is a timing diagram of steps 220 and 240 of FIG. 2.

For a more detail description regarding steps 220 and 240, FIG. 3 is presented to illustrate the timing diagram of steps 220 and 240. In step 240 (general mode), the scan lines S1, S2, S3 . . . Sn are scanned one by one to achieve the desired resolution in operation and the fast response speed. In this embodiment, scanning signals is sent to the scan lines, wherein the pulse width of the scanning signals is lt. For example, the range of the scan frequency is from about hundreds kHz to about thousands kHz. In step 220 (electricity-saving mode), it is only necessary to detect whether the touch panel is touched. Therefore, the scan lines S1, S2, S3 . . . Sn are periodically and synchronously scanned to save electricity.

In FIG. 3, the scan period T2 in step 220 is approximate equal to the scan period T1 in step 240 for illustrative purposes only. In one or more embodiments, the scan period T2 may be greater or less than the scan period T1.

In view of all of the above and the figures, it should be readily apparent to those with ordinary skilled in the art that the present disclosure introduces an apparatus and a method of saving power. A certain of the scan lines are synchronously scanned when the touch panel is not controlled by touch, so as to reduce the number of the scanning times. When the number of the scanning times is less, the number of charging—and—discharging is less, so that power is saved.

The reader's attention is directed to all papers and documents which are filed concurrently with his specification and which are open to public inspection with this specification, and the contents of all such papers and documents are incorporated herein by reference.

It will be understood that the above description of embodiments is given by way of example only and that those with ordinary skill in the art may make various modifications. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A driving circuit for a touch panel, the touch panel having a plurality of scan lines, the driving circuit comprising:
    a detection module for periodically scanning all the plurality of scan lines, so as to detect whether the touch panel is controlled by touch and detect an exact contact point when the touch panel is controlled by touch;
    an interruption module for turning off the detection module when the touch panel is not controlled by touch;
    a selective scan module for selecting one set of scan lines from at least two sets of the plurality of scan lines to periodically and synchronously scan the set of selected scan lines when the detection module is turned off, wherein scanning of the selected scan lines detects whether the touch panel is touched; and
    a switching module for turning on the detection module and turning off the selective scan module when the touch panel is touched.

2. The driving circuit of claim 1, wherein the selective scan module periodically and synchronously scans the selected scan lines.

3. The driving circuit of claim 1, wherein the scan lines comprise a plurality of first scan lines arranged along a first direction and a plurality of second scan lines arranged along a second direction, wherein the first and second directions are perpendicular and the first scan lines and the second scan lines are intersected vertically, and the first scan lines are electrically insulated from the second scan lines.

4. The driving circuit of claim 3, wherein the selective scan module selects the first scan lines to periodically and synchronously scan the first scan lines.

5. The driving circuit of claim 3, wherein the selective scan module selects odd numbered scan lines or even numbered scan lines from the plurality of first scan lines to periodically and synchronously scan the odd or even numbered scan lines.

6. The driving circuit of claim 1, wherein the detection module periodically scans the scan lines one by one.

7. A touch display, comprising:
the driving circuit of claim 1;
a touch panel having a plurality of scan lines;
a backlight source; and
a power switch module for turning off the backlight source when the touch panel is not controlled by touch.

8. The touch display of claim 7, further comprising:
a power drive module for turning on the backlight source when the touch panel is touched.

9. An electronic device, comprising:
the touch display of claim 7; and
an input device coupled to the touch display.

10. A method for driving a touch display, the touch display having a plurality of scan lines, the method comprising:
(a) periodically scanning all the plurality of scan lines through a detection module to detect whether the touch display is controlled by touch and detect an exact contact point when the touch panel is controlled by touch;
(b) stopping the step (a) by means of an interruption module when the touch display is not controlled by touch;
(c) selecting one set of scan lines from at least two sets of the plurality of scan lines to periodically and synchronously scan the set of selected scan lines through a selective scan module when the step (a) is stopped, wherein scanning of the set of selected scan lines detects whether the touch display is touched; and
(d) performing the step (a) anew and stopping the step (c) by means of a switching module when the touch display is touched.

11. The method of claim 10, wherein step (c) comprises:
periodically and synchronously scanning all of the scan lines.

12. The method of claim 10, wherein the scan lines comprises a plurality of first scan lines arranged along a first direction and a plurality of second scan lines arranged along a second direction, wherein the first and second directions are perpendicular and the first scan lines and the second scan lines are intersected vertically, and the first scan lines are electrically insulated from the second scan lines, wherein step (c) comprises:
selecting at least one set of the first scan lines from the first scan lines to periodically and synchronously scan the set of the selected first scan lines.

13. The method of claim 12, wherein the step of selecting at least one set of the first scan lines to periodically and synchronously scan the set of the selected first scan lines comprises:
selecting all of the first scan lines to periodically and synchronously scan the first scan lines.

14. The method of claim 12, wherein the step of selecting at least one set of the first scan lines to periodically and synchronously scan the set of the first scan lines comprises:
selecting odd numbered scan lines or even numbered scan lines from the first scan lines to periodically and synchronously scan the odd or even numbered scan lines.

15. The method of claim 10, wherein the step (a) comprises:
periodically scanning the scan lines one by one.

16. The method of claim 10, wherein the touch display further has a backlight source, the method further comprising:
turning off the backlight source when the touch display is not controlled by touch.

17. The method of claim 16, the method further comprising:
turning on the backlight source when the touch display is touched.

* * * * *